United States Patent [19]

Burroway et al.

[11] Patent Number: 4,902,741
[45] Date of Patent: Feb. 20, 1990

[54] SYNDIOTACTIC 1,2-POLYBUTADIENE LATEX

[75] Inventors: Gary L. Burroway, Doylestown; George F. Magoun; Ramesh N. Gujarathi, both of Akron, all of Ohio

[73] Assignee: The Goodyear Tire & Rubber Company, Akron, Ohio

[21] Appl. No.: 235,397

[22] Filed: Aug. 24, 1988

[51] Int. Cl.$^4$ ............................................. C08J 11/02
[52] U.S. Cl. ..................... 524/836; 526/92; 526/93; 526/903; 502/162; 502/167; 502/170; 502/171
[58] Field of Search .................... 524/836; 526/92, 93, 526/903

[56] References Cited

U.S. PATENT DOCUMENTS 4,429,085  12/1984  Henderson et al. .................. 526/92

FOREIGN PATENT DOCUMENTS 887689  12/1971  Canada .................. 524/836

Primary Examiner—Joseph L. Schofer
Assistant Examiner—Peter D. Mulcahy
Attorney, Agent, or Firm—Alvin T. Rockhill

[57] ABSTRACT

This invention reveals a technique for preparing syndiotactic 1,2-polybutadiene latex. It more specifically discloses a process for synthesizing syndiotactic 1,2-polybutadiene latex by polymerizing 1,3-butadiene in an aqueous medium in the presence of (1) at least one emulsifier, (2) a catalyst emulsion composition which is prepared by a microfluidization or microemulsification process, and (3) at least one member selected from the group consisting of carbon disulfide and phenyl isothiocyanate. Such syndiotactic 1,2-polybutadiene latices can be utilized in preparing blends of syndiotactic 1,2-polybutadiene with rubbers which are prepared by emulsion polymerization.

20 Claims, No Drawings

SYNDIOTACTIC 1,2-POLYBUTADIENE LATEX

BACKGROUND OF THE INVENTION

Syndiotactic 1,2-polybutadiene (SPBD) is a thermoplastic polymer which can be utilized in a wide variety of applications. For example, the incorporation of SPBD into rubber compositions which are utilized in the supporting carcass or innerliner of tires greatly improves the green strength of those compositions. Electron beam precure (microwave precure) is a technique which has gained wide commercial acceptance as a means of improving the green strength of synthetic elastomers which are used in building tires. However, electron beam precure techniques are costly. The incorporation of SPBD into blends of such synthetic elastomers can often improve green strength to the degree that electron beam precure is not required. The incorporation of SPBD into halogenated butyl rubbers which are utilized as the innerliner compositions for tires also greatly improves the scorch safety of such compositions. U.S. Pat. No. 4,274,462 disclosed that pneumatic tires having improved resistance against heat build-up can be prepared by utilizing SPBD fibers in their tread base rubber. SPBD can also be molded into a wide variety of useful articles.

Techniques for preparing SPBD by solution polymerization and by suspension polymerization are known in the art.

A process is disclosed in U.S. Pat. No. 3,778,424 for the preparation of syndiotactic 1,2-polybutadiene which comprises polymerizing 1,3-butadiene in an organic solvent in the presence of a catalyst composition composed of:

(a) a cobalt compound,
(b) an organoaluminum compound of the formula AlR$_3$, in which R is a hydrocarbon radical of 1–6 carbons, and
(c) carbon disulfide.

U.S. Pat. No. 3,901,868 reveals a process for producing a butadiene polymer consisting essentially of syndiotactic 1,2-polybutadiene by the successive steps of:

(a) preparing a catalyst component solution by dissolving, in an inert organic solvent containing 1,3-butadiene, a cobalt compound, soluble in the organic solvent, such as (i) cobalt-$\beta$-diketone complex, (ii) cobalt-$\beta$-keto acid ester complex, (iii) cobalt salt of organic carboxylic acid, and (iv) halogenated cobalt-ligand compound complex, and an organoaluminum compound,
(b) preparing a catalyst composition by mixing the catalyst component solution with an alcohol, ketone or aldehyde compound and carbon disulfide,
(c) providing a polymerization mixture containing desired amounts of 1,3-butadiene, the catalyst composition and an inert organic solvent, and
(d) polymerizing 1,3-butadiene at a temperature of $-20°$ C. to $90°$ C.

U.S. Pat. No. 4,429,085 discloses a process for producing syndiotactic 1,2-polybutadiene by suspension polymerization in an aqueous medium. In this aqueous polymerization process polybutadiene which has an essentially syndiotactic 1,2-microstructure is made by the steps of:

(A) preparing a catalyst component solution by dissolving, in an inert organic solvent containing 1,3-butadiene (a) at least one cobalt compound selected from the group consisting of (i) $\beta$-diketone complexes of cobalt, (ii) $\beta$-keto acid ester complexes of cobalt, (iii) cobalt salts of organic carboxylic acids having 6 to 15 carbon atoms, and (iv) complexes of halogenated cobalt compounds of the formula CoX$_n$, wherein X represents a halogen atom and n represents 2 or 3, with an organic compound selected from the group consisting of tertiary amine alcohols, tertiary phosphines, ketones, and N,N-dialkylamides, and (b) at least one organoaluminum compound of the formula AlR$_3$, wherein R represents a hydrocarbon radical of 1 to 6 carbon atoms;
(B) preparing a reaction mixture by mixing said catalyst component solution with a 1,3-butadiene/water mixture containing desired amounts of said 1,3-butadiene;
(C) preparing a polymerization mixture by mixing carbon disulfide throughout said reaction mixture, and
(D) polymerizing said 1,3-butadiene in said polymerization mixture into polybutadiene while agitating said polymerization mixture.

U.S. Pat. No. 4,751,275 discloses a process for the preparation of SPBD by the solution polymerization of 1,3-butadiene in a hydrocarbon polymerization medium, such as benzene, toluene, cyclohexane, or n-hexane. The catalyst system used in this solution polymerization contains a chromium-III compound which is soluble in hydrocarbons, a trialkylaluminum compound, and a dialkylphosphite, such as di-neopentylphosphite or di-butylphosphite.

Heretofore, blends of SPBD with rubbery elastomers have been prepared utilizing standard mixing techniques. For instance, SPBD can be mixed throughout a rubbery elastomer utilizing a Banbury mixer or a mill mixer. However, these standard mixing procedures have certain drawbacks. These drawbacks include high processing costs, polymer degradation, inadequate mixing, and process limitations. The processing equipment required in order to mix SPBD throughout rubbery elastomers by mastication is also expensive and very costly to operate. Such standard mixing procedures result in polymer degradation due to the high shearing forces and high temperatures which may be required for mixing. For instance, it is generally desirable to mix the SPBD throughout the rubbery elastomer at a temperature which is above the melting point of the SPBD. Accordingly, SPBD powder, which is utilized in tire innerliner or carcass compounds, is mixed into the compound utilizing standard mixing procedures at a temperature which is at least as high as the melting point of the SPBD being used. Since high mixing temperatures result in degradation of the rubbery elastomer being utilized as the innerliner or carcass compound, the melting point of the SPBD utilized has typically been limited to no more than about 190° C. In order to limit polymer degradation, the SPBD utilized in such applications typically has a melting point of no more than about 160° C. Even though the green strength of tire carcass compounds containing SPBD increases with the melting temperature of the SPBD, the higher mixing temperature associated with the higher melting SPBD makes its utilization very difficult because of the degradation that occurs utilizing standard mixing techniques. Furthermore, good dispersions of SPBD throughout rubbers are difficult to attain utilizing conventional mixing techniques.

SUMMARY OF THE INVENTION

This invention relates to a process for producing syndiotactic 1,2-polybutadiene latex. It more specifically discloses a process for producing a syndiotactic 1,2-polybutadiene latex which comprises polymerizing 1,3-butadiene monomer in an aqueous medium in the presence of (1) at least one emulsifier; (2) a catalyst emulsion composition which is comprised of (a) at least one cobalt compound selected from the group consisting of (i) β-ketone complexes of cobalt, (ii) β-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides, and (b) at least one organoaluminum compound of the formula $AlR_3$ wherein R represents a hydrocarbon radical of 1 to 6 carbon atoms, wherein said catalyst composition is microencapsulated in a polyene product and wherein said catalyst emulsion composition is microfluidized in an oil to a particle size which is within the range of about 10 nanometers to about 1000 nanometers; and (3) at least one member selected from the group consisting of carbon disulfide and phenyl isothiocyanate.

The subject invention also reveals a process for preparing a syndiotactic 1,2-polybutadiene latex by emulsion polymerization which comprises polymerizing 1,3-butadiene monomer in an aqueous reaction mixture which is comprised of (1) water, (2) at least one emulsifier, (3) 1,3-butadiene monomer, (4) a catalyst emulsion composition which is prepared by dissolving in an inert organic solvent containing at least one polyene (a) at least one cobalt compound selected from the group consisting of (i) β-ketone complexes of cobalt, (ii) β-keto acid ester complexes of cobalt, (iii) cobalt salts of organic arboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamies, and (b) at least one organoaluminum compound of the formula $AlR_3$ wherein R represents a hydrocarbon radical of 1 to 6 carbon atoms to produce a catalyst component solution, and microfluidizing the catalyst component solution with an oil, a surfactant, and water to an average particle size which is within the range of about 10 nanometers to about 1000 nanometers: and (5) at least one member selected from the group consisting of carbon disulfide and phenyl isothiocyanate.

The subject invention further discloses a catalyst emulsion composition which is useful in the emulsion polymerization of 1,3-butadiene monomer into syndiotactic 1,2-polybutadiene, which is prepared by dissolving in an inert organic solvent containing at least one polyene (a) at least one cobalt compound selected from the group consisting of (i) β-ketone complexes of cobalt, (ii) β-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides, and (b) at least one organoaluminum compound of the formula $AlR_3$ wherein R represents a hydrocarbon radical of 1 to 6 carbon atoms to produce a catalyst component solution, and microfluidizing the catalyst component solution with an oil, a surfactant, and water to an average particle size which is within the range of about 10 nanometers to about 1000 nanometers.

The latices made by the process of this invention can be utilized in preparing blends of SPBD with rubbery elastomers. This can be done by simply mixing the SPBD latex with the latex of a rubber. For instance, an SPBD/styrene butadiene rubber (SBR) blend can be prepared by simply mixing the SPBD latex with an SBR latex. The SPBD/SBR blend can then be recovered utilizing conventional coagulation techniques. By utilizing this technique, all of the drawbacks associated with conventional blending of dry SPBD with dry rubbers are overcome.

Blends of SPBD with various rubbery elastomers can also be prepared by utilizing the SPBD latex as the polymerization medium for preparing other emulsion rubbers. For instance, a blend of SPBD with SBR can be prepared by adding styrene monomer, 1,3-butadiene monomer, emulsifiers, and an appropriate initiator to a SPBD latex. The SBR is accordingly prepared by emulsion polymerization in the SPBD latex. This results in the formation of a latex which contains both SPBD and SBR. The SPBD/SBR blend can be recovered by simply coagulating the latex.

The SPBD latices made in accordance with this invention are also valuable for utilization in other applications. For instance, SPBD powders having a very small particle size can be prepared by simply drying the SPBD latex. SPBD made utilizing other polymerization techniques must be ground in order to obtain small particle size powders. The SPBD latices of this invention can also be applied to substrates and allowed to dry. This provides the substrate with a thin coating of the SPBD. For instance, rubber slabs can be dipped in SPBD latex to prevent them from sticking together.

DETAILED DESCRIPTION OF THE INVENTION

A catalyst emulsion composition is utilized to catalyze the emulsion polymerizations of this invention. A catalyst component solution is utilized in preparing such catalyst emulsion compositions. The catalyst component solution is prepared by dissolving at least one cobalt compound and at least one organoaluminum compound in an inert organic solvent containing at least one polyene monomer which is dissolved therein.

The term "an inert organic solvent" used herein refers to an organic solvent chemically inert to all of the catalyst components, the emulsifier, the 1,3-butadiene and the SPBD. Some representative examples of inert organic solvents include aromatic hydrocarbons, aliphatic hydrocarbons, alicyclic hydrocarbons, halogenated aromatic hydrocarbons, and mixtures of two or more of the above-mentioned compounds. Some representative examples of aromatic hydrocarbons that can be utilized include benzene, toluene, xylenes, ethylbenzene, diethylbenzene or isobutylbenzene. The aliphatic hydrocarbons which can be used include n-hexane, isohexanes, n-heptane, n-octane, isooctanes, n-decane, 2,2-dimethylbutane, petroleum ether, kerosene, petroleum spirit or petroleum naphtha. The alicyclic hydrocarbons that can be used include cyclohexane and methylcyclohexane. Some representative examples of halogenated aromatic hydrocarbons that can be used include chlorobenzene, dichlorobenzenes or trichlorobenzenes.

The cobalt compound usable for the process of the present invention is soluble in an inert organic solvent selected from the group consisting of (i) β-diketone compounds; (ii) β-keto acid ester complexes of cobalt; (iii) cobalt salts of organic carboxylic acids having 1 to 25 carbon atoms, and (iv) complexes of halogenated cobalt compounds of the formula $CoX_n$ wherein X represents a halogen atom and n represents 2 or 3, with an organic compound selected from the group consisting of tertiary amines, alcohols, tertiary phosphines, ketones and N,N-dialkylamides.

The β-diketone compound which can be used to form a complex with a cobalt atom is of the formula:

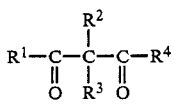

wherein $R^1$ and $R^4$, which are the same as or different from one another, are an alkyl radical of 1 to 6 carbon atoms and $R^2$ and $R^3$, which are the same as or different from one another, are a hydrogen atom or an alkyl radical having 1 to 6 carbon atoms. This type of β-diketone complex of cobalt may be cobalt (II) acetylacetonate or cobalt (III) acetylacetonate.

The β-keto acid ester which can be used to form a complex with a cobalt atom may be of the formula:

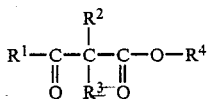

wherein $R^1$, $R^2$, $R^3$ and $R^4$ are the same as defined above. This type of cobalt complex may be a cobalt-acetoacetic acid ethyl ester complex.

Some representative examples of cobalt salts of organic carboxylic acids that can be used include cobalt octoate and cobalt naphthanate.

In the ligand compounds capable of forming a complex with a halogenated cobalt compound, the tertiary amine may be pyridine, triethylamine, tributylamine or dimethylaniline, the alcohol may be ethyl alcohol methyl alcohol, isopropyl alcohol, n-propyl alcohol, or n-butyl alcohol, the tertiary phosphine may be trimethyl phosphine, tributyl phosphine or triphenyl phosphine, the ketone may be acetone or methyl ethyl ketone and the N,N-dialkylamide may be N,N-dimethylformamide, N,N-dimethylacetamide, N,N-diethylformamide or N,N-diethylacetamide. The complex of halogenated cobalt is preferably either a complex of cobalt chloride with pyridine or ethyl alcohol.

The organoaluminum compound usable for the process of the present invention is of the formula $AlR_3$ wherein R represents a hydrocarbon radical containing from 1 to 6 carbon atoms. The hydrocarbon radical may be an alkyl, cycloalkyl or aryl radical containing from about 1 to about 6 carbon atoms. Preferably, the organoaluminum compound will be trimethylaluminum, triethylaluminum triisobutylaluminum or triphenylaluminum.

In the preparation of the catalyst component solution, it is important that the cobalt compound and the organoaluminum compound are dissolved in the inert organic solvent containing at least one polyene. Some polyenes that can be used in the formation of the polyene products used to prepare microencapsulated catalysts are 1,3-butadiene, 1,3-pentadiene, isoprene, myrcene and 1,5-cyclooctadiene. Polyenes in which at least two of the double bonds are conjugated and which have minimal substitution on the double bonds are preferred, particularly 1,3-butadiene. Other olefins which can be used are those which are capable of serving as chelating agents for transition metals, such as 1,5-cyclooctadiene. Polyenes with neither conjugation nor good chelating potential are much less effective. If the preparation is carried out in the absence of a polyene, the resultant catalyst component solution is not effective as a component of the catalyst composition of the present invention. The polyene is preferably used in a ratio by mole of at least 1.0, more preferably, at least 5.0 to the amount by mole of the cobalt compound to be used in the catalyst component solution. The preferred polyenes for use in this invention are 1,3-butadiene, 1,3-pentadiene, isoprene, and myrcene. The most preferred polyene is 1,3-butadiene.

Generally, the larger the ratio of the amount of polyene to the cobalt compound in the catalyst component solution, the higher the activity of the catalyst. However, the activity of the catalyst reaches a maximum value at a ratio by mole of polyene monomer to the cobalt compound used in the catalyst component solution of between 10 and 200. For example, if a molar ratio of polyene monomer to the cobalt compound of 10,000 is employed, the activity of the catalyst will be similar to that of the catalyst prepared from a catalyst component solution containing a ratio of polyene monomer to the cobalt compound of from 10 to 200. If the ratio is less than 1.0, the resultant catalyst composition has poor activity.

The catalyst component solution is preferably prepared at a temperature of $-10°$ C. to $50°$ C. and preferably contains 0.0005 to 1.0% by mole, more preferably 0.001 to 0.5% by mole, of the cobalt compound. The temperature at which the catalyst component solution is prepared will more preferably be within the range of $5°$ C. to $25°$ C. and it is also highly desirable to use vigorous agitation in the preparation of the catalyst component solution. Generally, from about 0.001 to 10 mole percent, more preferably from about 0.03 to about 5 mole percent of the organoaluminum compounds is utilized, based on the amount of 1,3-utadiene to be polymerized. The ratio by mole of the organoaluminum compound to the cobalt compound is preferably in a range from 0.2 to 50, more preferably, within the range of from 0.5 to 10.

In the preparation of the catalyst component solution, it is preferred for the cobalt compound to be first dissolved in the inert organic solvent in the presence of the polyene monomer and then for the organoaluminum compound to be added to the solution. However, very satisfactory results can also be obtained when the organoaluminum compound is added first.

In the preparation of this catalyst component solution, the organoaluminum compound should not be allowed to come in contact with water. This is because water can completely decompose such organoaluminum compounds. Accordingly, it is preferable that the inert organic solvent to be used to prepare the catalyst component solution be preliminarily dehydrated at least up to a content of water which is insufficient to completely decompose the entire amount of the organoaluminum compound.

It is preferable that the catalyst component solution be prepared using a dry (essentially water free) inert organic solvent. However, a trace of water in the inert organic solvent can be present up to a concentration of about 500 ppm (parts per million by weight). In fact, it is believed that the total elimination of water from such a catalyst component solution is undesirable. It is preferred for no more than 200 ppm of water to be present in the inert organic solvent used in the preparation of the catalyst component solution. If the content of water in the inert organic solvent is larger than 500 ppm, the catalyst component solution has to contain a relatively large amount of the cobalt compound and organoaluminum compound. This results in an economic disadvantage. If a sufficient amount of water is present in the inert organic solvent used in the preparation of the catalyst component solution, the catalyst can be completely destroyed. The catalyst component solution will preferably be stored under an inert gas atmosphere, such as nitrogen, in the absence of sunlight or ultraviolet light.

It is desirable to allow the prereaction used in the preparation of the catalyst component solution to run for a period of at least 30 seconds, and more preferably for at least 1 minute before mixing the catalyst component solution with the oil, surfactant, and water used in making the catalyst emulsion composition. Longer time periods can be used without the catalyst component solution losing its activity.

After the organoaluminum compound has been incorporated in the catalyst component solution using the above-described technique, the catalyst is "protected" from decomposition by water. This is believed to be due to a microencapsulation of the catalyst by polyene product formed in the prereaction process used in the preparation of the catalyst component solution.

It is believed that a hydrophobic shield is formed around the catalyst that water cannot readily penetrate: however, this hydrophobic shield or membrane is probably permeable by the butadiene monomer being polymerized into the syndiotactic 1,2-polybutadiene. When 1,3-butadiene is used as the polyene, the butadiene product which microencapsulates the catalyst is believed to be a butadiene monomer complex, an oligomerized butadiene or a polymer of butadiene. It has been determined that this protection is sufficient to allow for the use of this catalyst component solution in the aqueous emulsion polymerization of butadiene into SPBD.

The catalyst emulsion composition is prepared by microfluidizing or microemulsifying the catalyst component solution with an oil, a surfactant and water. In preparing the catalyst emulsion composition, it is highly desirable to first mix the catalyst component solution with the oil and to separately mix the surfactant with the water. The catalyst component solution/oil mixture is then subsequently mixed with the surfactant/water mixture immediately prior to the microfluidization. The ratio of oil to catalyst component solution will normally be within the range of about 0.5 to 30. It is normally preferred for the ratio of oil to catalyst component solution to be within the range of about 1 to about 10 and it is typically most preferred for the oil to catalyst component solution ratio to be within the range of about 2 to about 3. For example, a weight ratio of oil to catalyst component solution of about 2.5:1 is highly preferred.

The weight ratio of water to catalyst component solution utilized in preparing the catalyst emulsion composition is typically within the range of about 5 to about 80. It is normally preferred for the weight ratio of water to catalyst component solution to be within the range of about 10 to about 50. In most cases it will be more preferred for the weight ratio of water to catalyst component solution utilized in preparing the catalyst emulsion composition to be within the range of about 20 to about 30. For instance, a weight ratio of water to catalyst component solution of about 27:1 is highly preferred for utilization in preparing the catalyst emulsion compositions of this invention. The weight ratio of surfactant to catalyst component solution utilized in preparing the catalyst emulsion composition will typically be within the range of about 0.001 to about 10. In most cases it will be preferred to utilize a weight ratio of surfactant to catalyst component solution which is within the range of about 0.05 to 5. It is typically more preferred to utilize a ratio of surfactant to catalyst component solution which is within the range of about 0.1 to 0.3. Accordingly, a weight ratio of surfactant to catalyst component solution of about 0.2:1 is highly preferred.

The oil utilized in preparing the catalyst emulsion composition will typically be a long chain paraffinic oil. Such oils will generally be mixtures of various long chain hydrocarbons which contain from about 12 to about 28 carbon atoms. It is generally preferred for these compounds to be saturated. The oil will preferably be comprised of hydrocarbon compounds which contain from about 12 to about 18 carbon atoms. It is possible to utilize long chain alcohols which contain from about 12 to about 28 carbon atoms as the oil. The utilization of such alcohols results in the SPBD being synthesized having a lower melting point. It is, accordingly, desirable to use such alcohols as the oil if SPBD having a low melting point is desired. On the other hand, if SPBD having a high melting point is sought, then it will not be desirable to utilize alcohols as the oil. It is, of course, also possible to utilize a combination of paraffinic oils and alcohols to adjust the melting point of the SPBD as desired.

The surfactant utilized in preparing the catalyst emulsion composition will normally be an anionic surfactant or a nonionic surfactant. Some representative examples of types of anionic surfactants which can be utilized include carboxylates, alkylbenzene sulfonates, alkane sulfonates, α-olefin sulfonates, fatty alcohol sulfates, and oxo-alcohol sulfates. Some representative examples of types of nonionic surfactants which can be utilized include alkylphenol ethoxylates, fatty-alcohol polyethyleneglycol ethers, oxo-alcohol polyethyleneglycol ethers, ethylene oxide polymers, propylene oxide polymers, and fatty alcohol polyglycol ethers. It is generally preferred for the surfactant to be an anionic surfactant with alkyl benzene sulfonates, fatty alcohol sulfates, and oxo-alcohol ether sulfates being most preferred. The alkyl benzene sulfonates which are utilized generally have the structural formula:

wherein R represents an alkyl group containing from 8 to 18 carbon atoms and preferably wherein R represents an alkyl group containing from 10 to 13 carbon atoms. The fatty alcohol sulfates which can be utilized normally have the structural formula:

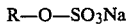

wherein R represents an alkyl group containing from 6 to 28 carbon atoms and preferably wherein R represents an alkyl group containing from 11 to 17 carbon atoms. The oxo-alcohol ether sulfates which can be utilized generally have the structural formula:

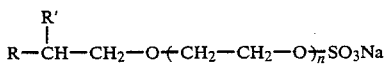

wherein n is an integer from 1 to about 4 and wherein R and R' represent alkyl groups which can be the same or different with the total number of carbon atoms in R and R' ranging from about 11 to about 13.

The microfluidization procedure utilized results in the formation of a catalyst emulsion composition which has an average particle size which is within the range of about 10 to about 1,000 nanometers. The catalyst emulsion composition prepared will preferably have an average particle size which is within the range of about 30 to about 600 nanometers and will more preferably have an average particle size which is within the range of about 60 to about 300 nanometers. This microfluidization procedure can be carried out utilizing conventional microfluidizers or other equipment which is capable of homogenizing the catalyst emulsion composition to the desired particle size. For instance, the microfluidization can be carried out utilizing a high pressure pump or series of pumps. Ultrasonic and/or mechanical means can be utilized in the microfluidization procedure. To attain the desired particle size, it may be advantageous to pass the catalyst emulsion composition which is being prepared through the Microfluidizer ™ more than one time.

The catalyst component solution utilized in preparing the catalyst emulsion composition is stable over long periods of time and can be stored for long periods without losing its activity. However, it is highly desirable to utilize the catalyst emulsion composition as soon as possible after it is prepared because the catalyst emulsion composition loses its activity over time. In practice, the catalyst emulsion composition loses essentially all of its activity after about 24 hours of being stored at room temperature. It is, accordingly, important to use the catalyst emulsion composition as soon as possible after its preparation.

The aqueous reaction mixture is prepared by mixing (1) water, (2) at least one emulsifier, (3) 1,3-butadiene monomer, (4) the catalyst emulsion composition and (5) carbon disulfide and/or phenylthiocyanate. Water is the major component in the aqueous reaction mixture. The amount of 1,3-butadiene monomer in the aqueous reaction mixture will vary from about 2 weight percent to about 50 weight percent. However, in most cases it will be preferred for the aqueous reaction mixture to contain from about 10 weight percent to about 40 weight percent 1,3-butadiene monomer. It will generally be more preferred for the aqueous reaction mixture to contain from about 20 to about 30 weight percent 1,3-butadiene monomer. The amount of emulsifier utilized in preparing the aqueous reaction mixture will normally be within the range of about 0.1 phm to about 10 phm (parts per hundred parts of monomer). It will normally be preferred for the emulsifier to be present in an amount ranging from about 0.5 phm to about 5 phm. In most cases, it will be more preferred for the emulsifier to be present in an amount within the range of about 1 phm to about 3 phm.

The emulsifiers used in the emulsion polymerization of 1,3-butadiene into SPBD may be charged at the outset of the polymerization or may be added incrementally or by proportioning as the reaction proceeds. Generally, anionic emulsifier systems provide good results, however, any of the general types of anionic, cationic or nonionic emulsifiers may be employed in the polymerization.

Among the anionic emulsifiers that can be employed in such emulsion polymerizations are fatty acids and their alkali metal soaps such as caprylic acid, capric acid, pelargonic acid, lauric acid, undecyclic acid, myristic acid, palmitic acid, margaric acid, stearic acid, arachidic acid, and the like; amine soaps of fatty acids such as those formed from ammonia, mono- and dialkyl amines, substituted hydrazines, guanidine and various low molecular weight diamines; chain-substituted derivatives of fatty acids such as those having alkyl substituents: naphthenic acids and their soaps and the like: sulfuric esters and their salts, such as the tallow alcohol sulfates, coconut alcohol sulfates, fatty alcohol sulfates, such as oleyl sulfate, sodium lauryl sulfate and the like; sterol sulfates: sulfates of alkylcyclohexanols, sulfation products of lower polymers of ethylene as $C_{10}$ to $C_{20}$ straight chain olefins, and other hydrocarbon mixtures, sulfuric esters of aliphatic and aromatic alcohols having intermediate linkages, such as ether, ester, or amide groups such as alkylbenzyl (polyethyleneoxy) alcohols, the sodium salt of tridecyl ether sulfate; alkane sulfonates, esters and salts, such as alkylchlorosulfonates with the general formula $RSO_2Cl$, wherein R is an alkyl group having from 1 to 20 carbon atoms, and alkylsulfonates with the general formula $RSO_2$—OH, wherein R is an alkyl group having from 1 to 20 carbon atoms; sulfonates with intermediate linkages such as ester and ester-linked sulfonates such as those having the formula $RCOOC_2H_4SO_3H$ and ROOC—$CH_2$—$SO_3H$, wherein R is an alkyl group having from 1 to 20 carbon atoms such as dialkyl sulfosuccinates: ester salts with the general formula:

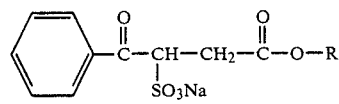

wherein R is an alkyl group having from 1 to 20 carbon atoms; alkylaryl sulfonates in which the alkyl groups contain preferably from 10 to 20 carbon atoms, e.g. dodecylbenzenesulfonates, such as sodium dodecylbenzene sulfonate; alkyl phenol sulfonates; sulfonic acids and their salts such as acids with the formula $RSO_3Na$, wherein R is an alkyl and the like; sulfonamides; sulfamido methylenesulfonic acids; rosin acids and their soaps; sulfonated derivatives of rosin and rosin oil; and lignin sulfonates, and the like.

Carboxylate emulsifiers are highly preferred. This is because their utilization leads to less build-up on the walls of the polymerization reactor. Fatty acid soaps and rosin acid soaps are representative examples of highly preferred carboxylate soaps. Of rosin acids, about 90 percent are isometric with abietic acid and the other 10 percent is a mixture of dehydro abietic acid and dihydro abietic acid.

Agitation should be provided in the preparation of the aqueous reaction mixture to ensure that the catalyst emulsion composition, the monomer, and the surfactant are distributed essentially homogeneously throughout the mixture. Since 1,3-butadiene monomer is very volatile, it will be necessary to prepare the aqueous reaction mixture under pressure in a closed system.

The carbon disulfide or phenyl isothiocyanate is typically the last component to be added to the aqueous reaction mixture. The addition of carbon disulfide and/or phenyl isothiocyanate to the reaction mixture which already contains the catalyst emulsion composition will initiate the polymerization reaction. The amount of carbon disulfide or phenyl isothiocyanate that can be added will vary between 0.005 phm and 2 phm. More preferably, the amount of carbon disulfide added will vary between 0.001 and 1 phm.

In the process of the present invention, the larger the proportion of the carbon disulfide in a range from about 0.0005 phm to about 0.5 phm in the polymerization mixture, the larger the yield of the SPBD obtained from the polymerization mixture. However, too large an amount of carbon disulfide, for example, larger than about 0.5 phm, causes a decrease in the polymer yield.

In the process of the present invention, the crystallinity and melting point of the polybutadiene produced can be controlled by adding alcohols, ketones, nitriles, aldehydes, or amides to the aqueous reaction mixture. In this aqueous emulsion polymerization process, there is a limitation of controlling crystallinity and melting point with agents which are water-soluble. Thus, ethanol and methanol are not as effective as other alcohols which are much less soluble in water than in hydrocarbons. Water soluble agents cannot be used as effectively to control crystallinity and melting point (only hydrocarbon soluble agents can be used). A detailed description of the agents and techniques that are used to control crystallinity and melting points is given in U.S. Pat. Nos. 3,901,868 and 4,153,767. These patents are incorporated herein by reference in their entirety. As has been pointed out, water soluble agents, such as ethanol and methanol, are not effective agents. Other alcohols such as, 2-ethyl-1-hexanol, 1-decanol, and 5-tridecanol, which are not soluble in water, can be used with better success.

The 1,3-butadiene monomer is polymerized into SPBD while agitating the polymerization mixture. If the use of an antioxidant is desired, it may be added conveniently at the beginning of the polymerization. This polymerization of 1,3-butadiene monomer can be carried out at a temperature from about −20° C. to about 100° C. It is preferable for the polymerization temperature to be from 0° C. to 60° C. The most preferred polymerization temperature is about 10° C. to about 30° C. At temperatures below 0° C., an antifreeze agent can be added to the polymerization mixture to keep it from freezing.

This polymerization can be carried out either under a normal pressure or in a pressurized system. This polymerization can be carried out under an inert gas atmosphere, such as a nitrogen atmosphere, with good results. Such a polymerization can be run for a period of from about 3 to about 30 hours. It is generally preferred for the polymerization to be run for a period which is within the range of about 10 to 16 hours. However, the optimum polymerization time will vary greatly with the polymerization temperature, catalyst, the amount of catalyst used, etc. In most cases, the optimum polymerization time will be within the range of about 12 to about 14 hours.

After the polymerization has been completed, the SPBD can be recovered from the latex by standard coagulation techniques. In the alternative, the SPBD latex can be blended with the latices of rubbery elastomers as desired or it can be utilized as the polymerization medium for preparing emulsion rubbers. In any case, the SPBD can be coagulated from the latex by utilizing standard techniques. For instance, coagulation can be accomplished by adding acids or blends of salts with acids to the latex. For example, sulfuric acid, hydrochloric acid, blends of sodium chloride with sulfuric acid and blends of hydrochloric acid with methanol are very effective as coagulating agents. Calcium chloride solutions and blends of calcium chloride with various acids can also be utilized as coagulants. Salt/acid coagulants are generally preferred. For instance, the utilization of sulfuric acid with sodium chloride or potassium chloride as the coagulant will lead to good results. Barium chloride and magnesium sulfate are additional examples of divalent salts which are suitable for utilization in coagulating the SPBD latex. It may also be advantageous to employ materials classified as coagulation aids, such as high molecular weight polyelectrolytes, in the coagulation of the SPBD latex. The preferred coagulation aids are weak bases. Some representative examples of suitable coagulation aids which can be used include Nalco TM 108 (Nalco Chemical Company), Daxad TM CP-1 (W. R. Grace and Company), and similar materials that are also weakly basic polyelectrolytes. The quantity of coagulant required will vary with the emulsifier, the amount of emulsifier used, the rubber being coagulated, and the type of coagulant being employed. Generally, the optimum type of coagulant, quantity of coagulant and coagulating conditions can be determined using a trial and error approach.

If a blend of the SPBD with a rubbery elastomer is sought, then the SPBD latex is mixed with a latex of the rubbery elastomer prior to coagulation. The coagulation of such blended latices results in the formation of a highly dispersed blend of SPBD throughout the rubbery elastomer. The amount of SPBD and rubber in the blend is determined by the amount of the various latices which are mixed together. It is, of course, important for the latices to be compatible with each other to prevent undesired reactions from taking place. Blends of SPBD with a wide variety of rubbery elastomers including high cis-1,4-polybutadiene, synthetic polyisoprene, SBR, isoprene-butadiene rubber, nitrile rubber, butyl rubbers, halogenated butyl rubbers, ethylene propylene diene monomer rubbers (EPDM), and ethylene propylene rubbers (EPR) can be made utilizing this technique.

In cases where the SPBD latex is utilized as the polymerization medium for producing emulsion rubbers typically additional water, emulsifiers initiator, and desired monomers will be added thereto. It is, of course, important to select an emulsifier, initiator, and monomers which are compatible with the SPBD latex. The monomers present in the polymerization medium are then polymerized into the rubbery elastomer desired. For instance, this can be done utilizing free radical polymerization techniques. Such polymerizations can be initiated utilizing standard chemical free radical initiators, ultraviolet light, or radiation.

To ensure a satisfactory polymerization rate, uniformity, and a controllable polymerization, free radical initiators are generally used with good results. Free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauroyl peroxide, cumene hydroperoxide, p-menthane hydroperoxide, t-butylhydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like: the various alkyl perketals, such as 2,2-bis-(t-butylperoxy)butane, ethyl 3,3-bis(t-butylperoxy) butyrate, 1,1-di-(t-butylperoxy) cyclohexane, and the like. Cumene hydroperoxide can be used as an initiator to obtain very good results in the polymerization of carboxylated nitrile rubber.

The emulsion polymerization system used in the synthesis of carboxylated rubbers can be treated at the desired degree of conversion with shortstopping agents, such as hydroquinone. The latex made can then be coagulated using a standard technique. This results in the formation of a highly dispersed blend of the SPBD throughout the rubbery elastomer.

In an alternative embodiment of this invention, SPBD latex can be prepared in the latex of a rubbery elastomer. Such polymerizations are carried out by adding 1,3-butadiene monomer, the catalyst emulsion composition, carbon disulfide and/or phenyl isothiocyanate, and additional emulsifiers if desired to the latex of the rubbery elastomer. A latex containing the SPBD as well as the rubbery elastomer will result. This latex can accordingly be coagulated to form a highly dispersed blend of the SPBD throughout the rubbery elastomer.

This invention is illustrated by the following examples which are merely for the purpose of illustration and are not to be regarded as limiting the scope of the invention or the manner in which it can be practiced. Unless specifically indicated otherwise, parts and percentages are given by weight. Particle sizes reported herein were determined utilizing a Nicomp Model 370 dynamic light scattering unit using automatic sample preparation techniques.

EXAMPLE 1

In this experiment a latex of SPBD was prepared. The first step of the procedure utilized involved making the catalyst component solution. This was done by charging 7.3 lbs. (3.3 kg) of hexane to a reactor which had been evacuated for 30 minutes. Then 0.61 lbs. (0.28 kg) of cobalt octoate was added with the mixture being agitated. Then 1.3 lbs. (0.59 kg) of 1,3-butadiene was added. After that 3.5 lbs. (1.59 kg) of triethylaluminum was added with the agitation being continued. Cooling was also utilized to keep the temperature of the mixture below about 70° F. (21° C.). After all of the triethylaluminum had been added and the temperature fell below 50° F. (10° C.). The catalyst component solution which had been prepared was transferred to a clean plastic 5 gallon (18.9 liter) carboy for storage in a cold room until needed. The catalyst component solution was additionally stored under a blanket of nitrogen in the absence of light.

A mixture of the catalyst component solution with a paraffinic oil was then prepared. This was done by mixing 450 grams of the catalyst component solution with 300 grams of a paraffinic process oil. A surfactant solution was also prepared. This was done by mixing 7 lbs. (3.2 kg) of water with 300 grams of an aqueous solution containing 28% sodium lauryl sulfate. The mixture of the oil with the catalyst component solution was then microfluidized with the surfactant solution. This was done in a homogenizer unit made by Microfluidics Corporation. Mixing of the aqueous and organic phases was accomplished utilizing a mixing Tee just ahead of the Microfluidizer TM pump. The homogenization process was continued until an average particle size for the catalyst emulsion composition of about 100 nanometers was attained. The catalyst emulsion composition prepared was determined to contain particles which varied in size from about 60 to about 300 nanometers.

A buffer solution having a pH of about 9.5 was prepared by mixing 20 lbs. (9.1 kg) of water with 1.8 lbs. (0.82 kg) of a tallow fatty acid. The buffer solution was added to a polymerization reactor and 12.5 lbs. (5.7 kg) of 1,3-butadiene monomer was charged into the reactor. The reactor was equipped with two afts with baffles for agitation which was carried out at 150 rpm. The catalyst emulsion composition prepared was charged into the reactor along with 9 grams of carbon disulfide which was dissolved in 391 grams of hexane. The polymerization was carried out at a temperature of about 50° F. (10° C.) for a period of 12 to 14 hours. A stable SPBD latex having a solids content of above 20% was produced.

EXAMPLE 2

In this experiment SPBD latex made by the procedure specified in Example 1 was utilized in the polymerization medium utilized in preparing emulsion SBR. This polymerization was carried out utilizing a 10 gallon (37.9 liter) reactor. The aqueous reaction mixture utilized was prepared by charging 8 lbs. (3.6 kg) of water, 50 lbs. (22.7 kg) of SPBD latex prepared by the procedure described in Example 1, 0.38 lbs. (170 grams) of a tallow fatty acid, 0.38 (170 grams) of a rosin acid, 0.11 lbs. (47.5 grams) of potassium sulfate, 0.04 lbs. (19.2 grams) of sodium naphthalene sulfonate (a dispersing agent), 0.005 lbs. (2.3 grams) of sodium hydrosulfide (an oxygen scavenger), 0.018 lbs. (7.9 grams) of sodium formaldehyde sulfoxylate (a reducing agent), 5.63 lbs. (2.54 kg) of styrene, 0.063 lbs. (28.3 grams) of t-dodecyl mercaptan (a chain regulator), 0.015 lbs. (6.8 grams) of p-methane hydroperoxide, 13.1 lbs. (5.9 kg) of 1,3-butadiene, and 0.4 grams of a chelated iron salt of tetraethyldiamine tetra-acetic acid which was dissolved in 1.25 lbs. (565 grams) of water. The polymerization was carried out at 50° F. (10° C.) under a nitrogen atmosphere. The polymerization was shortstopped when a solids content of about 23% was attained. The polymerization was shortstopped by charging a mixture containing 1 lbs. (452 grams) of water, 0.05 lbs. (22.6 grams) of sodium dithiocarbamate, and 0.05 lbs. (22.6 grams) of diethyl hydroxyl amine into the reactor.

A stable latex containing SPBD and SBR was obtained utilizing this procedure. The latex was coagulated to produce a highly dispersed blend of SPBD with SBR. This experiment shows that SPBD latex can be utilized in the polymerization medium used in preparing emulsion SBR. This procedure provides a convenient means of preparing highly dispersed blends of SPBD in SBR.

EXAMPLE 3

In this experiment a highly dispersed blend of SPBD in nitrile rubber was prepared. This was done by utilizing SPBD latex made by the procedure described in Example 1 as part of the polymerization medium.

This polymerization was carried out in a 10 gallon (37.9 liter) laboratory polymerization reactor. The polymerization medium was prepared by charging 22.7 kg of SPBD latex made by the procedure described in Example 1, 3.6 kg of water, 282.5 grams of a tallow fatty acid, 33.9 grams of tetrasodium pyrophosphate, 7.9 grams of sodium formaldehyde sulfoxylate, 2.8 kg of acrylonitrile, 50.9 grams of t-dodecylmercaptan, 7.9 grams of p-methanehydroperoxide, 5.7 kg of 1,3-butadiene, and 0.4 grams of a chelated iron salt of tetraethylene diamine tetracetic acid which was dissolved in 565 grams of water. The polymerization was carried out at 50° F. (10° C.) under a nitrogen atmosphere with agitation being applied. When a solids content of about 28% was attained, the polymerization was shortstopped by charging a solution containing 452 grams of water, 22.6 grams of sodium dithiocarbamate, and 22.6 grams of diethylhydroxyl amine into the reactor.

A latex containing both SPBD and nitrile rubber was prepared in this experiment. It could be coagulated to obtain a highly dispersed blend of SPBD in nitrile rubber. The latex prepared utilizing this procedure was very stable. This experiment shows that SPBD latex can be utilized as a major component of the polymerization medium in which emulsion nitrile rubber is prepared.

COMPARATIVE EXAMPLE 4

The procedure utilized in Example 1 was repeated in this experiment except that the paraffinic process oil was not utilized in preparing the catalyst emulsion composition. In this experiment the polybutadiene produced did not contain a significant amount of syndiotactic 1,2-microstructure. In fact, the polybutadiene produced was a rubbery polymer. This experiment shows that it is necessary to utilize an oil in preparing the catalyst emulsion composition. If the oil is not utilized in preparing the catalyst emulsion composition, SPBD is not produced in polymerizations which are initiated utilizing the catalyst.

While certain representative embodiments and details have been shown for the purpose of illustrating the subject invention, it will be apparent to those skilled in this art that various changes and modifications can be made therein without departing from the scope of this invention.

What is claimed is:

1. A process for producing a syndiotactic 1,2-polybutadiene latex which comprises polymerizing 1,3-butadiene monomer in an aqueous medium in the presence of (1) at least one emulsifier; (2) a catalyst emulsion composition which is comprised of (a) at least one cobalt compound selected from the group consisting of (i) $\beta$-ketone complexes of cobalt, (ii) $\beta$-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides, and (b) at least one organoaluminum compound of the formula $AlR_3$ wherein R represents a hydrocarbon radical of 1 to 6 carbon atoms, wherein said catalyst emulsion composition is microencapsulated in a polyene product and wherein said catalyst emulsion composition is microfluidized in an oil to a particle size which is within the range of about 10 nanometers to about 1000 nanometers: and (3) at least one member selected from the group consisting of carbon disulfide and phenyl isothiocyanate.

2. A process for preparing a syndiotactic 1,2-polybutadiene latex by emulsion polymerization which comprises polymerizing 1,3-butadiene monomer in an aqueous reaction mixture which is comprised of (1) water, (2) at least one emulsifier, (3) 1,3-butadiene monomer, (4) a catalyst emulsion composition which is prepared by dissolving in an inert organic solvent containing at least one polyene (a) at least one cobalt compound selected from the group consisting of (i) $\beta$-ketone complexes of cobalt, (ii) $\beta$-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides, and (b) at least one organoaluminum compound of the formula $AlR_3$ wherein R represents a hydrocarbon radical of 1 to 6 carbon atoms to produce a catalyst component solution, and microfluidizing the catalyst component solution with an oil, a surfactant, and water to an average particle size which is within the range of about 10 nanometers to about 1000 nanometers; and (5) at least one member selected from the group consisting of carbon disulfide and phenyl isothiocyanate.

3. A process as specified in claim 2 wherein the aqueous reaction mixture further comprises the latex of at least one rubbery polymer.

4. A process for preparing a latex which contains SPBD and a rubbery polymer which comprises utilizing the latex made by the process specified in claim 2 as at least a portion of the polymerization medium utilized in preparing the rubbery polymer by emulsion polymerization.

5. A process for preparing a highly dispersed blend of SPBD in a rubbery polymer which comprises coagulating the latex made by the process specified in claim 3.

6. A process for preparing a highly dispersed blend of SPBD in a rubbery polymer which comprises coagulating the latex made by the process specified in claim 4.

7. A process as specified in claim 2 wherein the catalyst emulsion composition is prepared utilizing a weight ratio of water to catalyst component solution which is within the range of about 50 to 80, a weight ratio of oil to catalyst component solution which is within the range of about 0.5 to 30, and a weight ratio of surfactant to the catalyst component solution which is within the range of about 0.001 to about 10.

8. A process as specified in claim 7 wherein the particle size is within the range of about 30 nanometers to about 600 nanometers.

9. A process as specified in claim 8 wherein the oil is comprised of hydrocarbon compounds which contain from about 12 to about 28 carbon atoms.

10. A process as specified in claim 9 wherein the surfactant is selected from the group consisting of carboxylates, alkylbenzene sulfonates, alkane sulfonates, β-olefin sulfonates, fatty alcohol sulfates, and oxo-alcohol sulfates.

11. A process as specified in claim 10 wherein the emulsifier is a carboxylate.

12. A process as specified in claim 11 wherein the aqueous reaction mixture contains from about 10 to about 40 weight percent 1,3-butadiene monomer.

13. A process as specified in claim 12 wherein the aqueous reaction mixture contains from about 0.5 to about 5 weight percent of the emulsifier.

14. A process as specified in claim 13 wherein said catalyst component solution contains from about 0.001% to 0.5% by mole of said cobalt compound and about 0.03% to about 5% by mole of said organoaluminum compound, based upon the amount by mole of said 1,3-butadiene monomer to be polymerized in said aqueous reaction mixture.

15. A process as specified in claim 14 wherein the member selected from the group consisting of carbon disulfide and phenyl isothiocyanate is carbon disulfide.

16. A process as specified in claim 15 wherein the aqueous reaction mixture contains from about 0.001 to about 1 mole percent carbon disulfide, based upon the amount by mole of said 1,3-butadiene monomer to be polymerized in said aqueous reaction mixture.

17. A process as specified in claim 16 wherein said polyene is 1,3-butadiene.

18. A process as specified in claim 17 wherein the process is carried out at a temperature which is within the range of 0° C. to 60° C.

19. A process as specified in claim 18 wherein the process is carried out under an inert gas atmosphere.

20. A process as specified in claim 19 wherein the average particle size is within the range of about 60 nanometers to about 300 nanometers.

* * * * *